Sept. 15, 1931.  N. J. GOODMAN  1,823,736
HOSIERY
Filed June 8, 1928
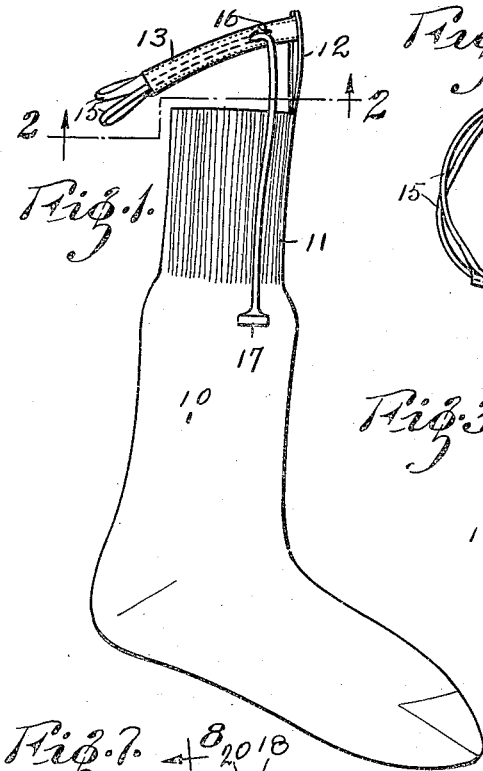
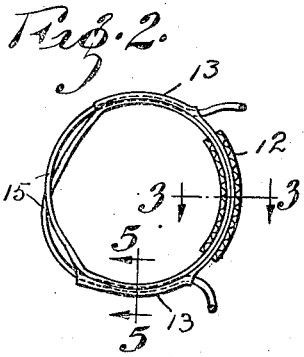
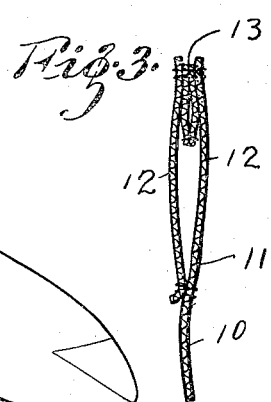
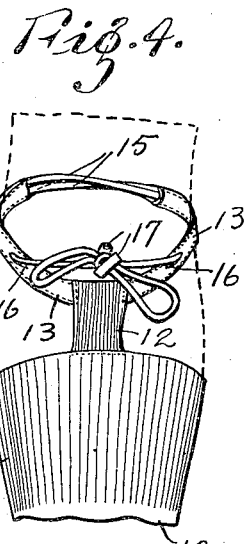
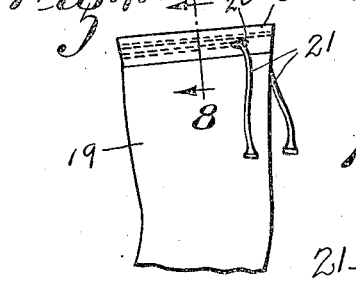
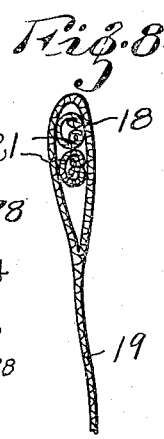
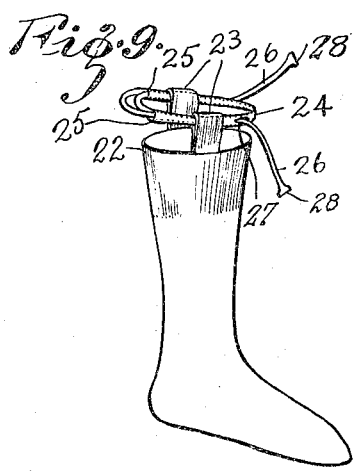
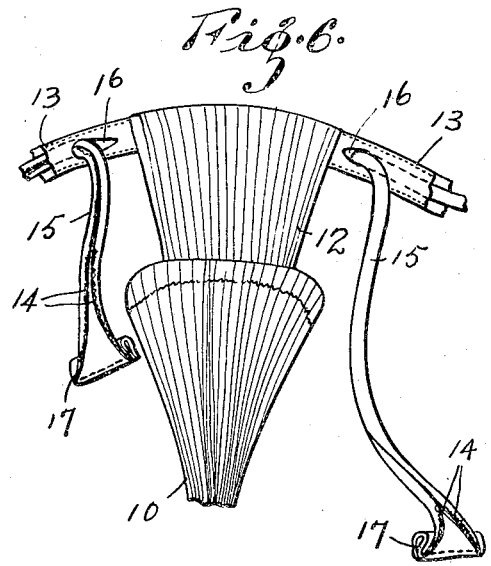
INVENTOR:
NATHAN J. GOODMAN.
By Edward E Lougan
ATTORNEY.

Patented Sept. 15, 1931

1,823,736

UNITED STATES PATENT OFFICE

NATHAN J. GOODMAN, OF ST. LOUIS, MISSOURI, ASSIGNOR TO COURTNEY S. GOODMAN, OF ST. LOUIS, MISSOURI

HOSIERY

Application filed June 8, 1928. Serial No. 283,950.

My invention relates to improvements in hosiery, and has for its primary object a hose which is provided with an attached garter or supporting means.

A further object is to construct a hose with supporting means, which supporting means are woven of the same material as the hose and which have a certain amount of inherent elasticity.

My device is applicable to hosiery of all kinds, and a particular advantage is that the garter or supporting means is washed simultaneously with the hose. Furthermore, my device can be readily adjusted as to tension and since it contains no rubber but depends merely on its peculiar weave for its elasticity, it is a great deal cooler than a supporter having rubber elastic therein and furthermore since it can be adjusted to any degree of tightness desired, there is no danger of stopping the circulation of blood.

In the drawings:

Fig. 1 is a side elevation of my device as applied to a sock;

Fig. 2 is a section taken on the line 2—2 of Fig. 1;

Fig. 3 is an enlarged section taken on the line 3—3 of Fig. 2;

Fig. 4 is a front view of the sock;

Fig. 5 is an enlarged section taken on the line 5—5 of Fig. 2;

Fig. 6 is an enlarged fragmental view of Fig. 4 with the supporter members untied showing the construction of their ends.

Fig. 7 is a fragmental view of the upper portion of hose as worn by women and children;

Fig. 8 is an enlarged section taken on the line 8—8 of Fig. 7; and

Fig. 9 is a perspective view of a man's sock showing a modified form of construction.

In the construction of my device I employ a sock having a body portion 10 which is provided at its upper end with the usual ribbed or elastic cuff 11. Extending upward from this cuff is a member 12 which is also knitted similar to the cuff 11 and is, therefore, elastic.

Carried by the upper end of the member 12 are tubular members 13. These tubular members, however, are only of a predetermined length as illustrated in Figs. 2 and 4. The remainder of the tubular member is not closed but has its edges 14 formed with a selvage. This selvage is put on the supporter members 15 during the knitting and it not alone prevents the fraying out or raveling of the edges but also tends to cause the members 15 to roll up as illustrated in Figs. 5 and 6 so as to form a longitudinally open tubular member. In other words, the supporter member 15 can be flattened out for inspection or during washing but will, again, immediately roll up in the form of a tube when released.

The tubular portions 13 are provided with openings 16 through which the ends of the supporter members 15 are passed. The extreme ends of the supporter members 15 are flattened and bent over upon themselves as indicated by the numeral 17 and then stitched down. This keeps the ends of the supporter members flat and prevents them from being drawn out through the openings 16.

From the above construction it will be noted that the supporter members at the rear cross over each other, that is there are two supporter members at the rear of the hose and these members are designed to surround the leg above the calf.

The forward portions of the supporter members 15 are then tied together, preferably in the form of a bow 17 after the supporter members have been drawn to the desired degree of tightness thereby supporting the hose in position.

As disclosed in Fig. 8 the upper end 18 of the stocking or hose 19 is made in the form of a tube, which is provided with openings 20 and through this tube 18 is passed the supporting member 21, which is of the same construction as the supporting members 15. It will be noted in this connection that the supporting member extends almost twice around the upper end of the stocking, that is the end is inserted through one of the openings 20, passed completely around the hose, and then out through the other opening. In this manner the upper end of the stocking can be tightened to any degree of tightness desired and, if it is desired to roll the stocking, the supporter member 21 furnishes an ideal foundation for such rolling.

In Fig. 9 I have disclosed still another modified form of sock in which the upper end 22 is provided with a pair of tabs or projections 23 on opposite sides of the sock. The tubular member 24 extends forward from these tabs or loops and is secured to the same at their forward edges. The tubular member 24 also extends slightly rearward from each one of the tabs and terminates at the point indicated by the numeral 25. From there on the supporter members 26 are formed in exactly the same manner as the supporter members 15, that is they are longitudinally open tubular members formed by knitting a selvage on the longitudinal edges of the supporter members.

These members are then brought forward and out through the openings 27, the ends 28 being treated in the same manner as the ends 17. By this construction a sock is supported at both sides instead of at the front only and gives the same effect as a garter which is provided with two gripping members.

One of the important features of my device is the construction of the supporter members in that the selvage along the longitudinal edges of the member is knitted so that the member will naturally assume a tubular form, that is, the edges will curl inward and, due to the fact that the members 15 are knitted, there is a certain amount of inherent elasticity in these members, and I have found that, even if the elasticity is somewhat destroyed by wearing, as soon as the hose are washed, the original elasticity returns to the supporter members.

It will be noted especially from Fig. 4 that when the supporter members are tied around the leg of the wearer that the members exert a canting grip on the leg thereby preventing the hose from slipping down.

I may also, if desired, instead of making the supporter members in the form of a longitudinally open tube, as disclosed in the drawings, construct them in such a manner that they will be flat without departing from the spirit of my invention.

Having fully described my invention, what I claim is:

1. A hose comprising a body portion, an extension carried by said body portion at its upper end, a pair of tubular members having flattened ends carried by said extension and each having openings in the walls thereof adjacent said extension, said members being closed for a portion of their length only, the remainder being in the form of a longitudinally open tube, forming supporter members, the end of one of said supporter members being threaded through the opposite tubular member and passing out through the opening in the wall thereof whereby said supporter members will pass twice around the leg of a wearer and the ends tied so as to hold said members in adjusted position on the leg.

2. A hose comprising a body portion, an extension carried by said body portion at its upper end, tubular members carried by said extension and having openings in the walls thereof adjacent said extension, said members being closed for a portion of their length only, the remainder being in the form of a longitudinally open tube forming supporter members, the end of one of said supporter members being threaded through the opposite tubular member and passing out through the opening in the wall thereof whereby said supporter members will pass twice around the leg of a wearer and the ends tied so as to hold said members in adjusted position.

3. A hose comprising a body portion, an extension carried by said body portion at its upper end, tubular members carried by said extension and each having openings in the walls thereof adjacent said extension, said members being closed for a portion of their length only, the remainder of each of said tubular members forming supporter members, the end of one of said supporter members being threaded through the opposite tubular member and passing out through the opening in the wall thereof whereby said supporter members can be adjusted and tied around the leg of the wearer in a canting position so as to hold said members in position and prevent the hose from moving downward.

4. A hose comprising a body portion, an elastic knit extension carried by said body portion at its upper front end, elastic knit tubular members carried by said extension, said members being closed for a portion of their length only and having an opening in the walls thereof, the remainder of said tubular members being open longitudinally and forming elastic supporter members, the end of one of said supporter members being threaded through the closed portion of the opposite tubular member and passing out through the opening in the wall thereof whereby said supporter members can be adjusted around the leg of the wearer in a canting position and the ends tied so as to secure said members in adjusted position and prevent the hose from moving downward.

In testimony whereof I have affixed my signature.

NATHAN J. GOODMAN.